United States Patent
Demets et al.

(10) Patent No.: US 10,842,290 B2
(45) Date of Patent: Nov. 24, 2020

(54) BEDDING PRODUCT COMPRISING A FOAMED LATEX LAYER, SLAB OF SUCH FOAMED LATEX LAYER FOR CUTTING A BEDDING PRODUCT THEREFROM AND METHOD OF MANUFACTURING THEREOF

(71) Applicant: Latexco N.V., Tielt (BE)

(72) Inventors: Henk Demets, Tielt (BE); Ruben De Gryse, Tielt (BE)

(73) Assignee: Latexco N.V., Tielt (BE)

( * ) Notice: Subject to any disclaimer, the term of this patent is extended or adjusted under 35 U.S.C. 154(b) by 0 days.

(21) Appl. No.: 16/504,200

(22) Filed: Jul. 5, 2019

(65) Prior Publication Data

US 2019/0328148 A1 Oct. 31, 2019

Related U.S. Application Data

(62) Division of application No. 14/437,807, filed as application No. PCT/EP2013/059822 on May 13, 2013, now abandoned.

(30) Foreign Application Priority Data

Oct. 23, 2012 (EP) .................................... 12189608

(51) Int. Cl.
| | |
|---|---|
| *A47C 27/14* | (2006.01) |
| *B29C 41/46* | (2006.01) |
| *B68G 7/04* | (2006.01) |
| *B29C 41/28* | (2006.01) |
| *B68G 11/04* | (2006.01) |
| *B29C 35/04* | (2006.01) |
| *B29C 35/08* | (2006.01) |
| *B29C 41/00* | (2006.01) |
| *B29K 105/04* | (2006.01) |
| *B29K 105/00* | (2006.01) |
| *B29L 31/00* | (2006.01) |
| *B29K 7/00* | (2006.01) |

(52) U.S. Cl.
CPC ............ *A47C 27/14* (2013.01); *B29C 41/003* (2013.01); *B29C 41/28* (2013.01); *B29C 41/46* (2013.01); *B68G 7/04* (2013.01); *B68G 11/04* (2013.01); *B29C 35/049* (2013.01); *B29C 35/0805* (2013.01); *B29C 2035/0861* (2013.01); *B29K 2007/00* (2013.01); *B29K 2105/0064* (2013.01); *B29K 2105/04* (2013.01); *B29L 2031/751* (2013.01)

(58) Field of Classification Search
CPC ...................................................... A47C 27/14
See application file for complete search history.

(56) References Cited

U.S. PATENT DOCUMENTS

| | | | |
|---|---|---|---|
| 2,575,259 A | 11/1951 | Cox et al. | |
| 2,604,666 A | 7/1952 | Bosomworth | |
| 2,706,183 A | 4/1955 | Carter | |
| 2,915,475 A | 12/1959 | Bugosh | |
| 3,028,610 A | 4/1962 | Talalay | |
| 3,215,647 A | 11/1965 | Dunn | |
| 4,354,810 A | 10/1982 | Stidham | |
| 4,940,502 A * | 7/1990 | Marcus ................. | D04H 1/435 |
| | | | 156/272.2 |
| 5,096,641 A | 3/1992 | Wietsma | |
| 5,492,741 A * | 2/1996 | Akao ....................... | B32B 5/18 |
| | | | 428/35.2 |
| 6,086,802 A * | 7/2000 | Levera ................ | B29C 33/0033 |
| | | | 264/45.8 |
| 6,230,347 B1 | 5/2001 | Alexander | |
| 6,312,244 B1 * | 11/2001 | Levera ................ | B29C 33/0033 |
| | | | 425/185 |
| 2003/0143938 A1 * | 7/2003 | Braunschweig ....... | B24D 11/02 |
| | | | 451/533 |
| 2006/0288492 A1 | 12/2006 | Robins | |
| 2008/0271252 A1 | 11/2008 | Abrigo et al. | |
| 2011/0067183 A1 | 3/2011 | Hawkins | |
| 2011/0197363 A1 | 8/2011 | Kokenes et al. | |
| 2011/0229668 A1 * | 9/2011 | Doyle ....................... | C08C 1/04 |
| | | | 428/35.5 |
| 2013/0174344 A1 | 7/2013 | Klancnik et al. | |
| 2017/0183830 A1 | 6/2017 | Lee | |

FOREIGN PATENT DOCUMENTS

| | | |
|---|---|---|
| CA | 2007548 | 7/1990 |
| EP | 0 279 551 | 8/1988 |
| EP | 1 508 420 | 2/2005 |
| EP | 1 904 570 | 1/2007 |
| GB | 1129436 | 10/1968 |

* cited by examiner

*Primary Examiner* — Eric J Kurilla
(74) *Attorney, Agent, or Firm* — Levy & Grandinetti

(57) ABSTRACT

A method for producing a bedding product has at least a foamed latex layer. The method includes pouring liquid latex foam on a conveyor belt. The liquid latex foam is vulcanized in a vulcanization station to obtain a vulcanized latex foam slab. The vulcanized latex foam slab is cut to a desired length and/or width. Electromagnetic waves with a frequency ranging between 1 and 50 Mhz are used for at least partially vulcanizing the liquid latex foam.

5 Claims, No Drawings

BEDDING PRODUCT COMPRISING A FOAMED LATEX LAYER, SLAB OF SUCH FOAMED LATEX LAYER FOR CUTTING A BEDDING PRODUCT THEREFROM AND METHOD OF MANUFACTURING THEREOF

TECHNICAL FIELD

The present invention concerns bedding products and in particular mattresses and toppers, comprising a foamed latex layer.

BACKGROUND OF THE INVENTION

Bedding products such as topers and mattresses made of latex foam are generally manufactured by steam vulcanization. Toppers having a thickness of maximally 6 cm are known which are produced in a continuous vulcanization process, whereby liquid latex foam is poured onto an endless belt or carrier and is subsequently passed through a steam oven. Above 6 cm thickness, continuous vulcanization is not possible because heat cannot be introduced into the core of the latex material sufficiently quickly due to the absence of aluminium pins on the conveyor belt.

Furthermore, when manufacturing latex foam layers by steam vulcanization it has been observed that the foam cell diameter and the foam density varies throughout the thickness of the layer which is undesirable for fine-tuning the properties of the latex foam layer, such as compression set and indentation load deflection values.

In order to address the above drawbacks, EP 1,904,570 discloses a composite foam comprising a top layer of latex foam and a second layer of a foam selected from either latex foam or another foam.

CA 2,007,548 discloses a method of manufacturing latex foam mattresses with a thickness up to 15 cm thick in a batch process whereby liquid latex foam is charged into a mold that is subsequently brought into a microwave field having a frequency of 2.45 Ghz (example 1) and a power of 1.2 kg latex charged.

Accordingly, there remains a need for a continuous method of manufacturing a latex layer having a uniform cell diameter, uniform foam density, low compression set and low indentation load deflection values and which can be produced in a thickness varying from about 1 cm up to 24 cm or more.

DETAIL DESCRIPTION OF THE INVENTION

Definitions

Toppers for use in bedding or seating products are known. These toppers extend across the entire width and length of the particular bedding or seating product. If the particular bedding or seating product is a mattress, typically one such topper is placed on one side of the mattress core, in particular the top side of the mattress which is the side where a person is meant to lie upon, and optionally a second topper is placed on the opposite side of the mattress core, thereby effectively "sandwiching" the mattress core. This combination then typically is covered with an upholstered fabric covering.

"Latex" is herein defined as a dispersion of polymeric particles in a continuous phase, the polymeric particles preferably having a size range of from 10 to 1000 nm. The latex foam material can be prepared from natural rubber latex or from one or more of such synthetic latexes as polybutadiene/styrene latex, polybutadiene/acrylonitrile latex, polychloroprene latex and the like or from a mixture of natural rubber latex and one or more such synthetic latexes. The latex foam includes conventional latex foam as well as visco-elastic latex foam.

The solids content of suitable aqueous latexes is from 20 to 75% by weight. Preferred latexes have a solid content of from 50 to 75% by weight.

Suitable polymer latexes all dispersions in which the solid is dispersed in a liquid phase and this phase in turn forms an emulsion with a further liquid phase. Examples are latexes of polymers consisting of dienes or olefinically unsaturated monomers and copolymers thereof, such as polystyrene-butadiene latex, polybutadiene latex, polyisoprene latex, natural rubber latex, acrylonitrile-butadiene latex, polychloroprene latex, polydichlorbutadiene latex, latex of a copolymer of chloroprene and dichlorobutadiene, polyisoprene latex, latex of chlorinated polyisoprene or (meth)-acrylate latex. Dispersions of polyurethanes or other dispersions in which polymers are dispersed in water with the aid of emulsifiers or dispersing agents are also suitable, however.

Preferred latexes include latexes of natural rubber, styrene-butadiene rubber (SBR) SBR having low styrene content (up to 27%), nitrile rubber (NBR), isoprene rubber, neoprene rubber, polybutadiene rubber, isobutylene-isoprene rubber (IIR), copolymers of acrylonitrile, methacrylonitrile, acrylates, methacrylates, vinylpyridine with butadiene or 2-chloro-1,3-butadiene and chlorinated polyethylene or mixtures of any of these.

Highly preferred are latexes of natural rubber, styrene-butadiene rubber, nitrile rubber, polybutadiene rubber, isoprene rubber or copolymers comprising acrylates.

Polymer-containing latexes, such as e.g. SBR (styrene-butadiene rubber) or NBR (acrylonitrile-butadiene rubber), polychloroprene, polybutadiene, polyisoprene, natural rubber latex, polyvinyl chloride, (meth)-acrylate dispersions or dispersions of copolymers thereof, are conventionally available commercially in solids concentrations of more than 50%. These concentrations can be achieved e.g. by increasing the concentration of low-concentration polymer latexes. The concentration of natural rubber latex is increased from 30% to 60% solids, for example.

Other preferred latexes are combinations of synthetic and natural latex. Preferred proportions of natural latex to synthetic latex can be varied from 1:4 to 6:4. Highly preferred proportions of natural to synthetic latex are more than 1:1.

The proportions should be optimized according to the latex used.

A method according to the present invention can be carried out using a device comprising an endless belt, means for pouring liquid latex foam on said belt, a vulcanization station provided along said belt comprising a electromagnetic wave generator for electromagnetic waves having a frequency between 1 and 50 MHz.

Optionally the device may comprise a second vulcanization station provided along said belt and downstream from said first vulcanization station, the second vulcanization station being steam heated.

The method according to the present invention for producing a bedding product comprises at least a foamed latex layer, said method comprising the steps of:
  pouring liquid latex foam on a conveyor belt;
  vulcanizing said liquid latex foam in a vulcanization station to obtain a vulcanized latex foam slab;
  cutting said vulcanized latex foam slab to a desired length and/or width, whereby for at least partially vulcanizing said liquid latex foam electromagnetic waves with a frequency ranging between 1 and 50 Mhz are used.

According to a first method the liquid latex foam is vulcanized up to a desired level solely by the use of electromagnetic waves, preferably in one single vulcanization station through which the conveyor belt is moved.

In this first method, vulcanization can be obtained in a period of several minutes by applying specific power of a electromagnetic wave generator used is chosen between 0.5 and 5 kW/kg latex in the vulcanization station.

Alternatively the vulcanization can be performed by means of electromagnetic waves up to a point wherein the foam layer is dimensionally stable and subsequently finish in a second vulcanization station wherein for example steam is used for heating the latex foam.

The use of the electromagnetic waves for at least partially vulcanizing the latex foam is advantageous in that foam layers between from 1 cm to more than 6 cm, preferably even more than 8 cm and most preferably up to even 24 cm in thickness can be vulcanized showing good performance in uniform cell diameter, uniform foam density, low compression set (lower than 10%) and low indentation load deflection values. Foam densities of as low as 40 kg/m$^3$ are achievable with the method according to the present invention.

According to an alternative method, the liquid latex layer can be poured upon a preformed foam layer provided on the endless conveyor belt, said preformed foam layer being made form a material chosen from the group comprising: polyurethane, polyolefin, polystyrene, visco-elastic latex dimensionally stable gelatinized but not fully vulcanized latex and or mixtures thereof.

In case the second layer is a gelatinized but not fully vulcanized latex layer, vulcanization of the second layer can be obtained in the vulcanization station used for vulcanizing the poured liquid latex foam layer.

Extensive trials with the method according to the present invention have shown that latex foam layer can be obtained with a 50% improvement in compression set (ISO1856) in view of latex foam layers vulcanized with steam vulcanization only. Other advantages of latex foam layers obtained by a method according to the present invention vs latex foam layers obtained by steam vulcanization alone include: improved resistance to loss of hardness for over more than 60000 cycles (ISO1957); improved tensile strength (ISO1798); lower correlation between density and hardness in the sense that lower foam densities can be achieved for a same hardness; improved thermoregulation (better heat absorption resulting in a improved comfort perception and faster adaptation of the foam latex to the body temperature of a person lying on the foam); and improved water absorption to 10% better water absorption without impact on the desorption rates).

Finally it has been found that by applying stamps on the latex foam layer during vulcanizing said liquid latex foam electromagnetic waves with a frequency ranging between 1 and 50 Mhz, patterns are created in the final foam layer, making it possible to personalize the outer surface of the latex layer easily, for example by providing a profiled logo in the top surface of the latex foam layer.

EXAMPLES

Example 1

A natural latex foam was prepared according to a known formula and poured on an endless belt between two side rims having a height of 26 cm along which a vulcanization station powered with an electromagnetic waves generator preset on 2.7 Mhz and a specific power of 2 KW/kg latex present in the vulcanization station. The vulcanization station has a length of 8 m, while the endless belt is set to move at a speed of 0.4 m/minutes.

At the exit of the vulcanization station, the vulcanized latex foam slab has thickness of 24 cm and is cut toppers of 1 m by 2 m. Several toppers where analyzed and showed low compression set and uniform foam density (weights of several toppers where very similar). The compression set was measured by compressing the topper to 50% of its initial thickness for 24 hrs at 70° C. and subsequently releasing pressure, whereby after 0.5 hours the thickness was measured. The compression set is defined as the loss in thickness after compression expressed in %. All results were between 5 and 6% loss in height.

The invention claimed is:

1. A method for producing a bedding product comprising at least a foamed latex layer, said method comprising the steps of:
   pouring liquid latex foam on a conveyor belt;
   vulcanizing said liquid latex foam in a vulcanization station to obtain a vulcanized latex foam slab; and
   cutting said vulcanized latex foam slab to a desired length and/or width, characterized in that for at least partially vulcanizing said liquid latex foam electromagnetic waves with a frequency ranging between 1 and 50 Mhz are used.

2. The method according to claim 1, wherein vulcanizing the latex foam is performed subsequently by means of electromagnetic waves and then by means of steam.

3. The method according to claim 1, wherein vulcanization is solely performed by the electromagnetic waves whereby the specific power of a electromagnetic wave generator used is chosen between 0.5 and 5 kW/kg latex in the vulcanization station.

4. The method according to claim 1, wherein the liquid latex foam is poured on the conveyor belt to a thickness of 1 cm or more, preferably 6 cm or more, most preferably 8 cm or more.

5. The method according to claim 1, wherein the liquid latex foam is poured on a layer of foam of a material chosen from the group comprising: polyurethane, polyolefin, polystyrene, visco-elastic latex, gelatinized while not fully vulcanized latex, and/or mixtures thereof.

* * * * *